United States Patent
Swanson et al.

(10) Patent No.: US 11,026,066 B2
(45) Date of Patent: Jun. 1, 2021

(54) DETERMINING WIRELESS NETWORK DEVICE LOCATION

(71) Applicant: AirMagnet, Inc., Santa Clara, CA (US)

(72) Inventors: Paul S. Swanson, Monument, CO (US); Warren L. Chambliss, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 45 days.

(21) Appl. No.: 15/704,880

(22) Filed: Sep. 14, 2017

(65) Prior Publication Data

US 2019/0082302 A1   Mar. 14, 2019

(51) Int. Cl.
| | |
|---|---|
| *H04W 4/20* | (2018.01) |
| *H04W 4/33* | (2018.01) |
| *H04B 1/3827* | (2015.01) |
| *H04B 1/00* | (2006.01) |
| *H04W 4/80* | (2018.01) |

(52) U.S. Cl.
CPC ............ *H04W 4/33* (2018.02); *H04B 1/0039* (2013.01); *H04B 1/3827* (2013.01); *H04W 4/80* (2018.02)

(58) Field of Classification Search
CPC ...... H04B 10/63; H04B 10/64; H04B 10/612; H04B 1/0032; H04B 7/2041; H04B 7/084; H04B 1/003; H04B 1/0014; H04B 1/0039; H04B 1/3827; H03C 3/40; H01Q 3/26; G01S 13/52; G01S 13/524; G01S 7/288; G01S 1/24; G01S 2013/0254; G01S 2013/0263; G01S 15/8927; G01S 13/4463; H04W 4/04; H04W 4/008; H04W 4/20; H04W 4/30; H04W 4/021; H04M 2203/20; H04M 2242/00
See application file for complete search history.

(56) References Cited

U.S. PATENT DOCUMENTS

| | | | |
|---|---|---|---|
| 6,600,443 B2 * | 7/2003 | Landt | ...................... G01S 3/043 340/6.1 |
| 6,820,225 B1 | 11/2004 | Johnson et al. | |
| 8,483,240 B2 * | 7/2013 | Ross | ...................... H04L 1/004 370/477 |

(Continued)

OTHER PUBLICATIONS

Radar Handbook, 2nd edition, Skolnik, McGraw hill, 1990 Chapter 10.

*Primary Examiner* — Rafael Pérez-Gutiérrez
*Assistant Examiner* — Xiang Zhang
(74) *Attorney, Agent, or Firm* — Locke Lord LLP; Scott D. Wofsy; Christopher J. Capelli

(57) ABSTRACT

A method for determining a location of a device in a wireless network includes transmitting a digital transmit signal from a digital transmitter including a first antenna. The first antenna is configured to transmit the digital transmit signal to two or more receivers. A first receiver including a second antenna and a second receiver including a third antenna receive the digital transmit signal from the digital transmitter. The digital transmit signal arrives at the receivers at two different time instances as a first digital signal and a second digital signal. A comparison of the digital signals is performed at the processor. A time difference of arrival of the digital signals is determined at the processor based on the performed comparison. The direction of travel of the digital transmit signal is estimated at the processor. A bearing to the digital transmitter is determined.

16 Claims, 4 Drawing Sheets

(56) References Cited

U.S. PATENT DOCUMENTS

| | | | | |
|---|---|---|---|---|
| 2001/0032514 | A1* | 10/2001 | Maruyama | G01H 9/00 |
| | | | | 73/657 |
| 2003/0117315 | A1* | 6/2003 | Graham | G01R 29/10 |
| | | | | 342/174 |
| 2004/0072582 | A1* | 4/2004 | Aljadeff | G01S 5/06 |
| | | | | 455/456.1 |
| 2008/0248808 | A1* | 10/2008 | Alizadeh-Shabdiz | |
| | | | | H04W 64/006 |
| | | | | 455/456.1 |
| 2009/0149202 | A1* | 6/2009 | Hill | G01S 5/0289 |
| | | | | 455/456.6 |
| 2010/0067602 | A1* | 3/2010 | Noel | H04B 7/0842 |
| | | | | 375/267 |
| 2013/0194078 | A1* | 8/2013 | Bohnenberger | G06K 7/0008 |
| | | | | 340/10.6 |
| 2014/0214359 | A1* | 7/2014 | Bartov | G01F 23/0076 |
| | | | | 702/156 |
| 2014/0292582 | A1* | 10/2014 | Ware | G01S 5/04 |
| | | | | 342/450 |
| 2015/0005011 | A1* | 1/2015 | Nehrenz | H04W 4/02 |
| | | | | 455/456.3 |
| 2016/0285561 | A1* | 9/2016 | Wu | G02B 6/428 |
| 2016/0345286 | A1* | 11/2016 | Jamieson | H04B 17/12 |

\* cited by examiner

DETERMINING WIRELESS NETWORK DEVICE LOCATION

FIELD OF THE INVENTION

Embodiments of the present invention relate generally to wireless services, and specifically to determining wireless network device location.

BACKGROUND OF THE INVENTION

Determining the location of a wireless device, such as a wireless telephone typically uses GPS or trilateration of mobile telephone signals broadcast from cell towers at known positions. These methods, however do not work well indoors. Indoor positioning is important for determining the location of a portable device or a transmitting device in buildings such as malls, hotels, offices, train stations etc.

It is desirable to have systems that are well equipped to quickly and efficiently find an unknown location of a transmitter.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for determining a location of a device in a wireless network includes transmitting a digital transmit signal from a digital transmitter including a first antenna. The first antenna is configured to transmit the digital transmit signal to two or more receivers. A first receiver including a second antenna and a second receiver including a third antenna receive the digital transmit signal from the digital transmitter. The digital transmit signal arrives at the first and second receivers at two different time instances as a first digital signal and a second digital signal. A comparison of the first and second digital signals is performed at the processor. A time difference of arrival of the first and second digital signals is determined at the processor based on the performed comparison. The direction of travel of the digital transmit signal is estimated at the processor based on the determined time difference of arrival of the first and second digital signals. A bearing to the digital transmitter is determined based on the estimated direction of travel of the digital transmit signal.

In another aspect, a system for determining a location of a device in a wireless network is provided. The system includes a digital transmitter including a first antenna. The system further includes a first receiver including a second antenna and a second receiver including a third antenna. The first antenna is configured to transmit the digital transmit signal to two or more receivers. The system further includes a signal processing device having a processor and a memory device coupled to the processor in communication with the first receiver and with the second receiver. The memory device contains a set of instructions that, when executed by the processor, cause the processor to perform a comparison of a first and second digital signals. The first and second digital signals represent a digital transmit signal transmitted by the digital transmitter. The digital transmit signal arrives at the first and second receivers at two different time instances as the first digital signal and the second digital signal. The set of instructions that, when executed by the processor, further cause the processor to determine a time difference of arrival of the first and second digital signals based on the performed comparison and estimate the direction of travel of the digital transmit signal based on the determined time difference of arrival of the first and second digital signals. The set of instructions that, when executed by the processor, also cause the processor to determine a bearing to the digital transmitter based on the estimated direction of travel of the digital transmit signal.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
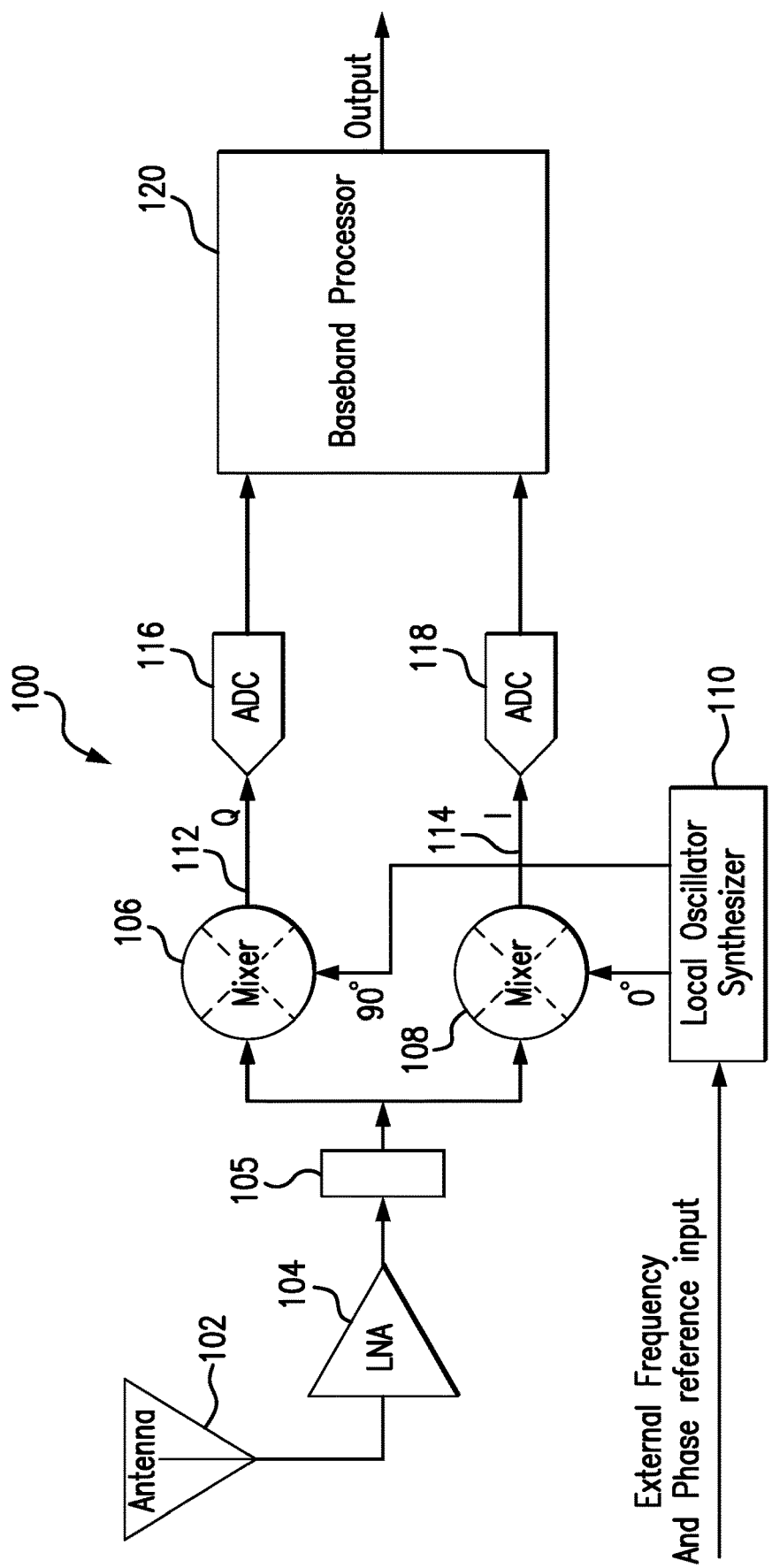
FIG. 1 is a simplified block diagram of a software-defined radio (SDR) RF front-end one embodiment the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

FIG. 1 is a simplified block diagram of a SDR RF front-end in one embodiment of the present invention. The receiver 100 facilitates reception of signals from a remote digital transmitter using an antenna 102. A low noise amplifier (LNA) 104 coupled to one or more band-limiting filters 105 amplifies received signals from the antenna 102 and helps reduce unwanted noise. The one or more band-limiting filters 105 limit the measured characteristics to a particular wavelength range.

Positioning accuracy of radio technology is directly dependent on the accuracy of the delay measurements. For example, for navigation receivers that use GNSS, such as GPS or GLONASS (hereinafter collectively referred to as "GNSS") transmissions from non-GNSS frequencies that are near GNSS frequencies can cause degraded performance of GNSS services, such as less positional accuracy, by interfering with the delay measurements.

For example, a GPS based GNSS device may use timing information transmitted on the L1 band from 1563.42 MHz to 1587.42 MHz. Without filtering, transmissions from the next lower band from 1525 MHz to 1559 MHz could interfere with accurate measurement of the timing signals in the L1 band. Thus, the receiver 100 in FIG. 1 employs the antenna 102, the LNA 104 and the band-limiting filter 105 to remove the unwanted frequencies in bands outside of the band of interest (i.e., L1 band).

From the antenna 102 the received signal is fed through the LNA 104 and the band-limiting filter 105 to RX quadrature mixers 106, 108 in which the received information is translated to baseband frequency (i.e. down-converted to DC or close to DC) by mixing the received signals with quadrature local oscillator signals. These are normally generated by dividing a local oscillator signal from a local oscillator or synthesizer 110 responsible for frequency generation by a factor 2 or a higher. The two outputs from the mixers 106, 108 are a quadrature component 112 and an in-phase component 114, and they are converted to digital values in the analog-to-digital converter units 116 and 118 and further processed in the baseband processing stages by a baseband processor 120. In various embodiments, the baseband processor 120 may comprise a clock management module, a decoder, an encoder, a controller, CRC check and calculation module, etc.

Figure 2:
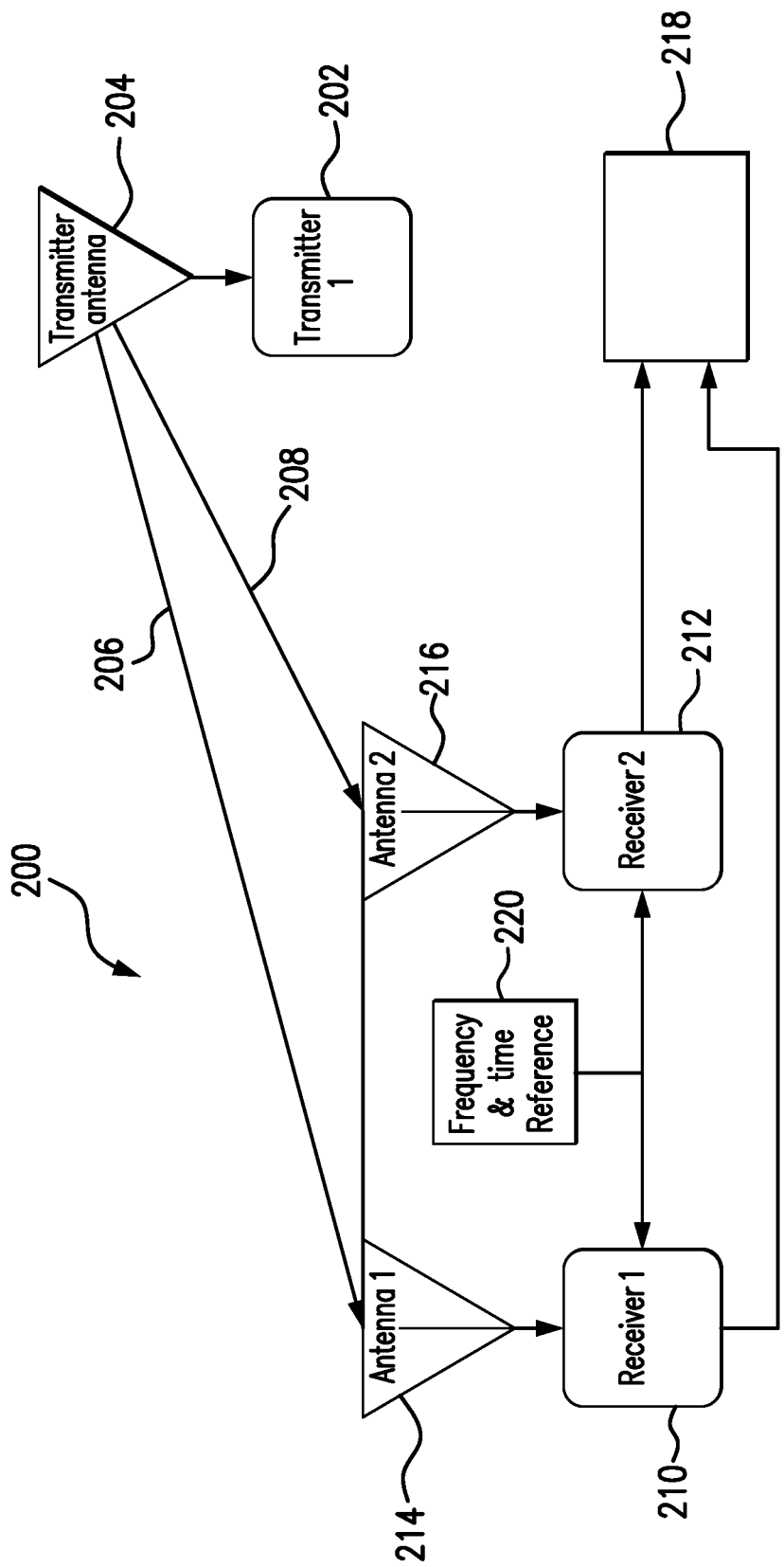
FIG. 2 is a functional block diagram of a system for determining a time difference of arrival (TDOA) and bearing calculations of a plurality of signals transmitted from a remote digital transmitter with respect to two an as of coherent receivers, in accordance with an embodiment of the present disclosure.

FIG. 2 is a functional block diagram of a system for determining a TDOA and bearing calculations of a plurality of signals transmitted from a remote digital transmitter with respect to two antennas of coherent receivers, in accordance with an embodiment of the present disclosure. As illustrated, the system 200 is configured to determine a geolocation of the remote transmitter 202 having an antenna 204. In response to receiving a signal transmitted by the transmitter antenna 204, the system 200 processes the received signals 206 and 208 to determine a geolocation of the remote transmitter 204. In an example, the system 200 determines the geolocation of the remote digital transmitter 204 by determining a frequency-difference-of arrival (FDOA) of the signals received by the pair of receivers 210 and 212 having respective antennas 214 and 216. The system 200 determines the geolocation of the remote transmitter 202 by determining a TDOA between the signals received by the receivers 210-212. In various embodiments the remote transmitter 202 can support short-range or long-range wireless access technologies such as Bluetooth, ZigBee, WiFi, DECT (Digital Enhanced Cordless Telecommunication), or cellular communication technologies, just to mention a few. Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. In other words, the remote transmitter 202 may comprise a Wi-Fi module configured to communicate with the first receiver 210 and second receiver 212, a Bluetooth module configured to communicate with paired first receiver 210 and second receiver 212, a Zigbee module and the like.

According to an embodiment of the present invention, the receivers 210-212 are coherent receivers integrated on a single chip and are synchronized. A single node 220 (a master node) may be used as a source node. The master node 220 can thus be used to set a common frequency and time reference for all the receivers of the system 200. Alternatively, the synchronization may be performed otherwise. In the end, all the receivers 210-212 are synchronized.

A signal processing device 218 includes a processor and a memory device coupled to the processor and is communicatively coupled to an output of the receivers 210 and 212. The signal processing device 218 mathematically compares each signal to all other signals. In one embodiment, the system 200 time aligns the received signals by delaying one signal with respect to others until maximum coherency is achieved. This delay may be measured by the signal processing device 218 and is directly proportional to the difference in time of arrival of the signal to different receivers 210-212.

Figure 3:
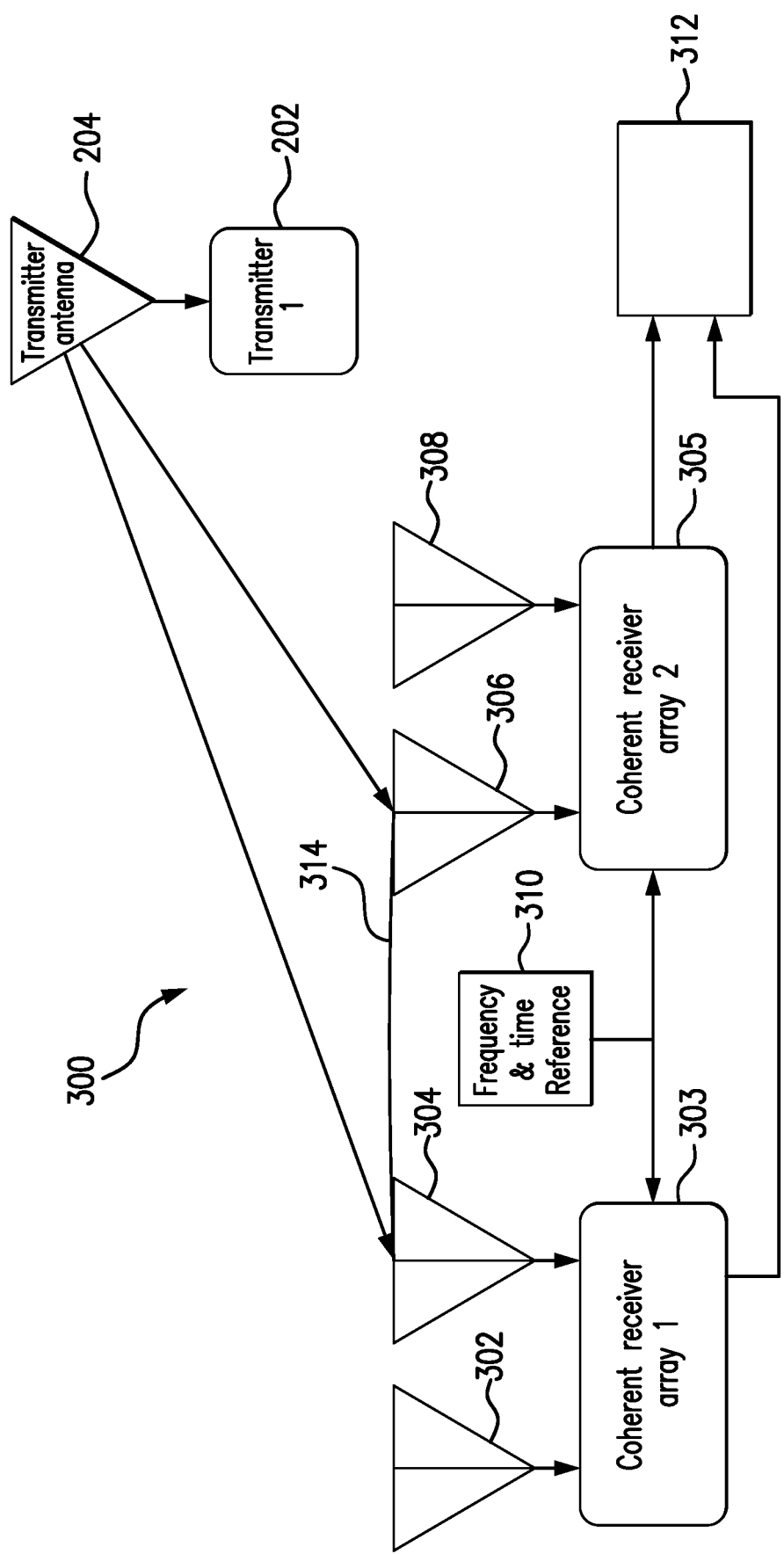
FIG. 3 illustrates a functional block diagram of a system for determining differential time of arrival using two bearings and a known baseline in accordance with an embodiment of the present disclosure.

FIG. 3 illustrates a functional block diagram of a system 300 for determining differential time of arrival using two bearings and a known baseline in accordance with an embodiment of the present disclosure. In this system, a digital packet-based transmitter 202 having an antenna 204 transmits a signal which travels through an environment and couples to at least two arrays of antennas 302, 304, 306 and 308. Although there are only four antennas shown (two per array), in general there is a number p of antennas forming each array. Note that more than p antennas may be physically present, and sectoring techniques can be used to dynamically select the p antennas from which signals are received. Typically, in addition to a direct path signal from the transmitter 202 to the arrays, there may be additional multipath signals reflected from various environmental objects. These direct and multipath signals contain spatial information that may be measured by coherently receiving the signals using the illustrated antenna arrays.

The signals from antenna 204 of the transmitter 202 are coupled to the antennas 302-308 and received by corresponding arrays of receivers 303 and 305. In the illustrated scenario, a first pair of antennas 302 and 304 belongs to a first receiver array 303 and a second pair 306, 308 belongs to a second receiver array 305. These receiver arrays 303 and 305 are coherently synchronized so that they preserve the relative phase information between the signals coupled to the antennas 302-308. A single master node 310 (a master node) may be used to set a common frequency and time reference for all the receiver arrays 303, 305 of the system 300. Each receiver array 303, 305 digitizes the received signals based on the produced I and Q signal components (as shown in FIG. 1) and converts the received signal(s) to baseband.

A signal processing device 312 includes a processor and a memory device coupled to the processor and is communicatively coupled to an output of the receiver arrays 303 and 305. The signal processing device 312 mathematically compares each signal to all other signals to determine time of arrival of the signal to different receiver arrays 303 and 305. Once the difference of time of arrival is determined by the signal processing device 312, the device 312 may also calculate a range and bearing (direction) to the transmission source (e.g., the digital transmitter 202) based on reception times of the signal, known baseline vector 314 between the receiver arrays 303 and 305, trigonometry and knowledge of the speed of propagation of the signal.

Figure 4:
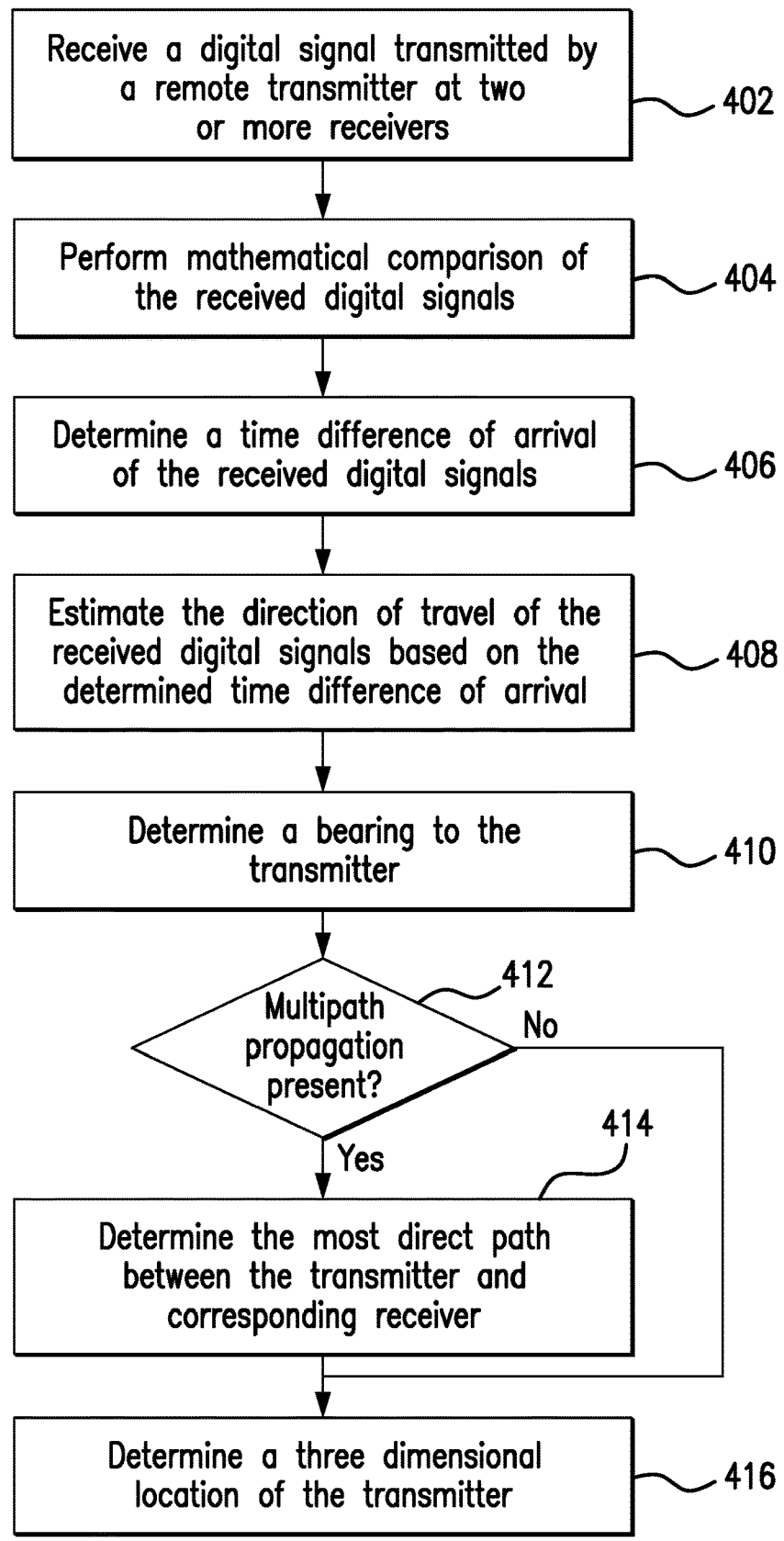
FIG. 4 is a flow diagram of a method for determining wireless network device location in accordance with an embodiment of the present disclosure.

FIG. 4 is a flow diagram of a method for determining wireless network device location in accordance with an embodiment of the present disclosure. Before turning to description of FIG. 4, it is noted that the flow diagram shown therein is described, by way of example, with reference to components shown in FIGS. 1-3, although these operational steps may be carried out in any system and are not limited to the scenario shown in the aforementioned figure. Additionally, the flow diagram in FIG. 4 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

At step 402, two or more wireless radio receivers 210, 212 receive a signal transmitted by a remote digital transmitter 202. In various embodiments the remote digital transmitter 202 may be for Wi-Fi, Bluetooth, Zigbee, or other local area networks, personal area networks, or local mesh networks that can provide data or voice communication connections between two or more wireless devices without involving wide area network costs and overhead. At least in some embodiments, the digital transmit signal may be a single packet. Exemplary internal components of the wireless radio receivers 210, 212 are shown in FIG. 1. Such components may include mixers 106, 108 coupled to corresponding ADCs 116, 118 for converting a received incoming analog signal to digital code. In one embodiment, the wireless receivers 210 and 212 may comprise synchronized coherent receivers sharing a common time reference. In alternative embodiments, the wireless receivers receiving the signal transmitted by the remote transmitter 202 may comprise two or more coherent receiver arrays, such as arrays 303 and 305 shown in FIG. 3. More precisely, the synchronization function mentioned above refers to the task, taking place prior to receiving the signal transmitted by the transmitter 202, of establishing a common time reference between the receivers. According to an embodiment of the present invention, the transmitted digital signal arrives at the wireless receivers 210 and 212 at two substantially different time instances.

At step 404, the signal processing devices 218, 312 of the systems illustrated in FIGS. 2 and 3 perform a mathematical comparison of the received signals. In one example, the mathematical comparison of the two (or more) received signals is performed by using a signal processing technique known as cross correlation. In one embodiment, the signal processing devices 218, 312 of FIGS. 2 and 3, respectively, provide cross correlation measurements to estimate the parameters and direction of arrival of received signals. Signal parameters, such as pulse repetition interval (PRI), pulse width, intensity, modulation, frequency and multiple signal presence are estimated with a single channel. Estimation of direction of arrival requires two or more signals. The cross correlation technique estimates the direction of arrival of multiple signals if the signals have different PRI values. It should be noted that multi-channel receivers typically allow covariance estimation using the cross correlation calculations and high resolution angle (direction) of arrival measurements using known techniques for angle super resolution.

In an alternative embodiment, the mathematical comparison of the two (or more) received signals is performed by using a signal processing technique known as signal subtraction. For example, the signals received on the two antennas 214, 216 of two respective receivers 210, 212 can be used by the signal processing devices 218, 312 to form a difference signal. Since receiving the transmitted signal through the two antennas 214, 216 could have the effect of producing two different versions (i.e., different phases) of the signal, subtracting the outputs of the antennas 214, 216 will produce a difference signal that may not have a value of zero. The polarity of the delayed signal can be compared with the polarity of the received signals to determine the direction of the digital transmitter 202 in relation to the respective antennas.

At step 406, the signal processing devices 218, 312 determine a time difference of arrival of the received digital signals using, for example, the cross correlation measurements obtained at step 402. The difference in time of arrival may be measured from the channel impulse response by a number of different schemes including: peak detection, leading edge detection based on thresholding, adaptive thresholding, and schemes based on an analysis of the slope of the leading edge. In one embodiment, once signal is time delayed with respect to the other until maximum coherency is achieved—this delay is directly proportional to the difference in time of arrival of the transmitted signal to different receivers 210, 212. At step 408, the signal processing devices 218, 312 may estimate the direction of travel of the received digital signals based on the determined time difference of arrival by utilizing the multipath-free components of the signals received from the transmitter 202. According to an embodiment, the coherent receiver arrays 303 and 305 shown in FIG. 3 may be configured to determine an angle of arrival of a target signal with respect to the direction of travel. For example, the first antennas 302 and 306 of the respective receiving arrays 303 and 305 may generate signals indicating an angle of arrival of the received signal in a horizontal plane. The second antennas 304 and 308 may generate signals indicating an angle of arrival of the received signal in a vertical plane. When the system 300 includes more than two pairs of coherent receiving arrays 303, 305, each pair may be configured to generate signals indicating a corresponding angle of arrival.

According to an embodiment of the present invention, once the signal processing devices 218, 312 determine the difference in time of arrival to two or more receivers 210, 212 or two or more receiving arrays 303, 305, at step 410, the signal processing devices 218, 312 can calculate a bearing (direction) to the transmitter 202 of the digital signal based on trigonometry and knowledge of the speed of propagation of the signal (typically the speed of light). The signal processing devices 218, 312 receive and process the digitized electrical signals. In some embodiments, the signal processing devices 218, 312 include a high-resolution direction of arrival angle estimator, namely, a minimum variance distortionless response (MVDR) (Van Veen, B. D., and K. M. Buckley, "Beamforming: a versatile approach to spatial filtering," IEEE ASSP Magazine, vol. 5, pp. 4-24, 1988) and/or a multiple signal classification (MUSIC) (Adaptive Filter Theory by S. Haykin, published by Prentice Hall, 1991) module for determining a direction of arrival angle (also called the bearing angle) of the signal from the digital transmitter 202. The direction indictor includes a bearing. The bearing is the angular difference between a local reference axis and a vector extending from the receivers 210, 212 towards the transmitter 202. In some embodiments, the direction indicator includes a single azimuthal angle corresponding to azimuth used in two-dimensional polar coordinates and the time stamp. In some embodiments, the direction indicator includes two angles corresponding to azimuth and zenith (elevation) used in three-dimensional spherical coordinates and the time stamp. Bearing information from two or more disparate locations within the local area can additionally be used to determine device location by triangulation method well-known in the art.

A problem in wireless systems is the occurrence of interfering signals. These interfering signals typically originate from a number of sources including background noise, separate transmission sources and multipath effects. Background noise and separate transmission sources are often unavoidable, but can be filtered out or accommodated in system design in some circumstances. Interference due to multipath effects can be more problematic, especially where the timing and/or phase information contained in the signal is important.

According to an embodiment of the present invention, at step 412, the signal processing devices 218, 312 determine if significant multipath signal components are present for one or more receiving antennas 214-216 and/or 302-308. Multipath components are individual RF wavefronts emitted by the same transmitter antenna 204, but which arrive at a receiving antenna along different paths. These different paths are the result of wavefront reflections caused by physical terrain and structure surrounding wireless network environment, as well as other physical occurrences in the RF transmission environment. The multipath components of a particular signal are substantially identical, except for a distinct time shift, power level, and carrier phase. In other words, at step 412, the signal processing devices 218, 312 determine if the same signal reached one or more receivers 210, 212 or receiver arrays 303, 305 by different pathways due to reflections from physical objects in the vicinity of the signal pathway.

The presence of multipath creates multiple multipath correlation spikes in received signals. The leading edge signal results from the shortest direct propagation path between the two antennas. Multipath signals will be delayed from the direct path and thus will be rejected by the signal processing devices 218, 312 for transmitter's location determination purposes. Accordingly, in response to detecting the presence of multipath signals (decision block 412, "Yes" branch), at step 414, the signal processing devices 218, 312 determine the shortest direct propagation path between transmitting and receiving antennas. Thus, the systems of FIGS. 2 and 3 can deliver precise distance measurements in the presence of multipath interference including static and dynamic multipath—a desirable characteristic for dynamic systems.

According to an embodiment of the present invention, if the multipath signals are not present (decision block 412, "No" branch), at step 416, the signal processing devices 218, 312 may determine a three dimensional location (e.g., three dimensional spherical coordinates) of the digital transmitter 202. As noted above, while only respective pairs of antennas 302, 304 and 306, 308 are shown for each of the coherent receiver arrays 303, 305 in the system of FIG. 3, in various embodiments these arrays 303, 305 may comprise a plurality of antennas. The signal processing device 312 may begin step 416 by capturing first signal with a first subset of antennas from the receiver array (e.g., first array 303). The signal processing device 312 may follow immediately by switching to a different subset of antenna elements and capturing a second signal with a second subset of antennas of the first array 303. For example, a first signal may be captured with a row of antennas and the second capturing may be done with a column of antennas. A row of antennas may provide a horizontal degree orientation such an azimuth in a spherical coordinate system. A column of antennas may provide a vertical degree orientation such as elevation. Antenna elements used for capturing first signal and capturing second signal may be aligned in straight, vertical, horizontal, or diagonal orientation. Thus, advantageously, the system of FIG. 3 can calculate a more accurate three dimensional position of the digital transmitter 202 in space.

In view of the above, embodiments of the present invention provide more efficient technique of determining a location of a packet based digital transmitting device in a wireless network as compared to directional antennas. Typical directional antennas require rotation in search for received signal's maxima/minima. In contrast, embodiments of the present invention provide a technique enabling signal bearing determination based on a single data packet. In various embodiments the remote digital packet based transmitter may be for Wi-Fi, Bluetooth, Zigbee, or other local area networks, personal area networks, or local mesh networks that can provide data or voice communication connections between two or more wireless devices without involving wide area network costs and overhead.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a location of a device in a wireless network, the method comprising steps of:
    transmitting a digital transmit signal from a digital transmitter comprising a first antenna, wherein the first antenna is configured to transmit the digital transmit signal to two or more receivers;
    receiving, at first and second coherent receiver arrays the digital transmit signal from the digital transmitter to determine an angle of arrival of the digital transmit signal with respect to a direction of travel, wherein the first coherent receiver array includes a second plurality of antennas such that a first antenna of each of the first and second coherent receiver arrays generate signals indicating an angle of arrival of the received digital transmit signal in a horizontal plane and a second antenna of each of the first and second coherent receiver arrays generate signals indicating an angle of arrival of the received digital transmit signal in a vertical plane and wherein the digital transmit signal arrives at the first and second coherent receivers at two different time instances as a first digital signal and a second digital signal;
    performing a comparison, at a processor, of the first and second digital signals by performing a signal subtraction between the first and second digital signals to produce a difference signal whereby the polarity of a delayed signal is compared to the polarity of the received first and second signals to determine a direction of the digital transmitter in relation to the first and second antennas;
    determining, at the processor, a time difference of arrival of the first and second digital signals based on the performed comparison;
    estimating, at the processor, the direction of travel of the digital transmit signal based on the determined time difference of arrival of the first and second digital signals; and
    determining, at the processor, a bearing to the digital transmitter based on the estimated direction of travel of the digital transmit signal wherein the bearing is the angular difference between a local reference axis and a vector extending from the first and second coherent receiver arrays.

2. The method of claim 1, wherein the two receivers coherent receivers are integrated on a single chip.

3. The method of claim 1, wherein the step of estimating the direction of travel of the digital transmit signal comprises estimating the direction based on propagation speed of the digital transmit signal.

4. The method of claim 1, wherein the step of estimating the direction of travel of the digital transmit signal comprises determining whether a multipath propagation of the digital transmit signal is detected and estimating the direction of travel of the digital transmit signal by identifying a most direct path between the digital transmitter and a corresponding receiver, responsive to the detection of the multipath propagation of the digital transmit signal.

5. The method of claim 1, wherein the first receiver and the second receiver are positioned at two different locations and wherein the step of estimating the direction of travel of the digital transmit signal further comprises determining a precise location of the digital transmitter by performing triangulation.

6. The method of claim 1, wherein the digital transmit signal comprises a single packet.

7. The method of claim 1, wherein the digital transmitter is configured to support at least one of short-range and long-range wireless access technologies.

8. The method of claim 7, wherein the at least one of short-range and long-range wireless access technologies comprises one of Bluetooth, ZigBee, WiFi, DECT (Digital Enhanced Cordless Telecommunication), cellular communication technologies, and the like.

9. A system for determining a location of a device in a wireless network, the system comprising:
a digital transmitter comprising a first antenna;
first and second coherent receiver arrays for receiving a digital transmit signal from the digital transmitter to determine an angle of arrival of the digital transmit signal with respect to a direction of travel, wherein the first coherent receiver array includes a second plurality of antennas such that a first antenna of each of the first and second coherent receiver arrays generate signals indicating an angle of arrival of the received digital transmit signal in a horizontal plane and a second antenna of each of the first and second coherent receiver arrays generate signals indicating an angle of arrival of the received digital transmit signal in a vertical plane and wherein the digital transmit signal arrives at the first and second coherent receivers at two different time instances as a first digital signal and a second digital signal;
a signal processing device comprising a processor and a memory device coupled to the processor in communication with the first coherent receiver and the second coherent receiver, the memory device containing a set of instructions that, when executed by the processor, cause the processor to:
perform a comparison of a first and second digital signals, wherein the first and second digital signals represent a digital transmit signal transmitted by the digital transmitter and wherein the digital transmit signal arrives at the first and second receivers at two different time instances as the first digital signal and the second digital signal, the comparison of the first and second digital signals includes performing a signal subtraction between the first and second digital signals to produce a difference signal whereby the polarity of a delayed signal is compared to the polarity of the received first and second signals to determine a direction of the digital transmitter in relation to the first and second antennas;
determine a time difference of arrival of the first and second digital signals based on the performed comparison;
estimate the direction of travel of the digital transmit signal based on the determined time difference of arrival of the first and second digital signals; and
determine a bearing to the digital transmitter based on the estimated direction of travel of the digital transmit signal wherein the bearing is the angular difference between a local reference axis and a vector extending from the first and second coherent receiver arrays.

10. The system of claim 9, wherein the first receiver and the second receiver are integrated on a single chip.

11. The system of claim 9, wherein the set of instructions that, when executed by the processor, cause the processor to perform the comparison further cause the processor to perform a cross correlation between the first and second digital signals.

12. The system of claim 9, wherein the set of instructions that, when executed by the processor, cause the processor to perform the comparison further cause the processor to perform a signal subtraction between the first and second digital signals.

13. The system of claim 9, wherein the set of instructions that, when executed by the processor, cause the processor to estimate the direction of travel of the digital transmit signal further cause the processor to estimate the direction based on propagation speed of the digital transmit signal.

14. The system of claim 9, wherein the set of instructions that, when executed by the processor, cause the processor to estimate the direction of travel of the digital transmit signal further cause the processor to determine whether a multipath propagation of the digital transmit signal is detected and estimate the direction of travel of the digital transmit signal by identifying a most direct path between the digital transmitter and a corresponding receiver, responsive to the detection of the multipath propagation of the digital transmit signal.

15. The system of claim 9, wherein the first receiver and the second receiver are positioned at two different locations and wherein the set of instructions that, when executed by the processor, cause the processor to estimate the direction of travel of the digital transmit signal further cause the processor to determine a precise location of the digital transmitter by performing triangulation.

16. The system of claim 9, wherein the digital transmit signal comprises a single packet.

* * * * *